United States Patent
Tasdizen

(10) Patent No.: US 11,501,571 B2
(45) Date of Patent: Nov. 15, 2022

(54) DEPTH PROCESSING

(71) Applicant: Arm Limited, Cambridge (GB)

(72) Inventor: Ozgur Tasdizen, Cambridge (GB)

(73) Assignee: Arm Limited, Cambridge (GB)

( * ) Notice: Subject to any disclaimer, the term of this patent is extended or adjusted under 35 U.S.C. 154(b) by 50 days.

(21) Appl. No.: 17/061,982

(22) Filed: Oct. 2, 2020

(65) Prior Publication Data

US 2021/0142031 A1     May 13, 2021

(30) Foreign Application Priority Data

Nov. 11, 2019 (GB) ..................................... 1916364

(51) Int. Cl.
| | |
|---|---|
| *G06T 7/579* | (2017.01) |
| *G06V 40/18* | (2022.01) |
| *G06F 3/01* | (2006.01) |
| *G06V 10/28* | (2022.01) |

(52) U.S. Cl.
CPC ............ *G06V 40/193* (2022.01); *G06F 3/013* (2013.01); *G06T 7/579* (2017.01); *G06V 10/28* (2022.01); *G06T 2200/28* (2013.01)

(58) Field of Classification Search
CPC ......... G06F 3/013; G06T 7/579; G06T 7/194; G06T 2200/28; G06V 10/28
See application file for complete search history.

(56) References Cited

U.S. PATENT DOCUMENTS

| | | | | |
|---|---|---|---|---|
| 2009/0116732 A1* | 5/2009 | Zhou | ................... | H04N 13/261 348/42 |
| 2014/0253688 A1* | 9/2014 | Metz | .................... | G01S 7/4915 348/46 |
| 2015/0016713 A1* | 1/2015 | Mori | ....................... | G06T 7/579 382/154 |
| 2015/0341535 A1* | 11/2015 | Forutanpour | ...... | H04N 5/23219 348/222.1 |
| 2017/0285736 A1* | 10/2017 | Young | ..................... | G06F 1/163 |
| 2017/0287112 A1* | 10/2017 | Stafford | .................. | G06F 3/013 |
| 2018/0063504 A1 | 3/2018 | Haines | | |
| 2018/0261003 A1 | 9/2018 | Peli | | |
| 2019/0331914 A1* | 10/2019 | Lee | ........................ | G06F 3/0304 |
| 2020/0309955 A1* | 10/2020 | Laflaquiere | ............. | G01S 17/10 |

OTHER PUBLICATIONS

United Kingdom Combined Search and Examination Report dated Jul. 29, 2020 for GB Application No. 1916364.1.

* cited by examiner

*Primary Examiner* — Phi Hoang
(74) *Attorney, Agent, or Firm* — EIP US LLP

(57) ABSTRACT

A method comprising the steps of obtaining at least one frame of input data from at least one sensor, the frame of input data representative of a real-world environment at a given time. The frame is analysed to determine at least a foveal region within the frame, and at least a method for generating depth information associated with the real-world environment based on the frame of input data is selected. The method is applied to the foveal region to generate depth information associated with the foveal region, and at least the depth information associated with the foveal region is outputted.

16 Claims, 3 Drawing Sheets

DEPTH PROCESSING

CROSS-REFERENCE TO RELATED APPLICATIONS

This application claims the benefit under 35 U.S.C. § 119(a) and 37 CFR § 1.55 to US Patent Application No. 1916364.1 filed on Nov. 11, 2019, the entire content of which is incorporated herein by reference.

BACKGROUND OF THE INVENTION

Field of the Invention

The present invention relates to methods, hardware accelerators, and systems for obtaining depth information. The disclosure has particular, but not exclusive relevance to obtaining depth information in relation to predefined areas of an input.

Description of the Related Technology

Sensor systems are capable of capturing images and other data in relation to a real-world environment in great detail and with great accuracy. With the increase in processing power available in modern computing devices, the amount of information a computer device is capable of analyzing is also increasing. As such it is possible to process sensor data to obtain more detailed, and in some examples, more useful data for display and/or use by a user or by the computing device.

Such information includes data regarding the distance of objects from the sensor system, which may be employed not only in robotics or navigation-related applications but may also be employed in image processing applications. Therefore, it is desirable to improve the efficiency, and reduce the cost of obtaining and gathering such information.

SUMMARY

According to a first aspect of the present invention, there is provided a method comprising the steps of obtaining at least one frame of input data from at least one sensor, the frame of input data representative of a real-world environment at a given time; analysing the frame to determine at least a foveal region within the frame; selecting at least one method for generating depth information associated with the real-world environment based on the frame; applying the method to the foveal region to generate depth information associated with the foveal region; and outputting at least the depth information associated with the foveal region.

According to a second aspect of the present invention, there is provided a hardware accelerator comprising an input module arranged to obtain at least one frame of input data from at least one sensor, the frame representative of a real-world environment at a given time; an analysis module for analysing the frame to determine at least a foveal region within the input data; a selection module for selecting at least one method for generating depth information associated with the real-world environment based on the frame; a processing module for applying the method to the foveal region to generate depth information associated with the foveal region; and an output module for outputting at least the depth information associated with the foveal region.

According to a third aspect of the present invention, there is provided a system comprising an image sensor; a hardware accelerator according to the second aspect, arranged to receive at least one frame of input data from the image sensor.

According to a fourth aspect of the present invention, there is provided a non-transitory computer-readable storage medium comprising a set of computer-readable instructions stored thereon which, when executed by at least one processor, cause the at least one processor to obtain at least one frame of input data from at least one sensor, the frame of input data representative of a real-world environment at a given time; analyse the frame to determine at least a foveal region within the input data; select at least one method for generating depth information associated with the real-world environment based on the frame of input data; apply the method to the foveal region to generate depth information associated with the foveal region; and output at least the depth information associated with the foveal region.

BRIEF DESCRIPTION OF THE DRAWINGS

Further features and advantages will become apparent from the following description of the preferred embodiments, given by way of example only, which is made with reference to the accompanying drawings in which like reference numerals are used to denote like features.

DETAILED DESCRIPTION OF CERTAIN INVENTIVE EMBODIMENTS

Details of methods and processors according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one example, but not necessarily in other examples. It should be further noted that certain examples are described schematically with certain features omitted and/or necessarily simplified for the ease of explanation and understanding of the concepts of the examples.

Capturing data relating to a real-world environment has a number of uses, in particular in relation to autonomous vehicles, augmented reality, and virtual reality. Obtaining information relating to the real-world environment is often undertaken by different sensor systems, including but not limited to sensors capable of capturing visual data, such as a camera, and sensors capable of capturing time-of-flight information, such as sonar or LiDAR.

Information captured from such sensor suites can be processed and combined to create detailed maps of a real-world environment for use by further processors, such as the processors configured to direct an autonomous vehicle. However, the introduction of additional sensor systems and the processing associated with them not only increases the cost of a device but also increases the computational complexity associated with generating the depth information. Therefore, it is an object of the present invention to provide a method, hardware accelerator and system capable of producing detailed environment maps efficiently, and without the need for a large number of sensors systems.

Figure 1:
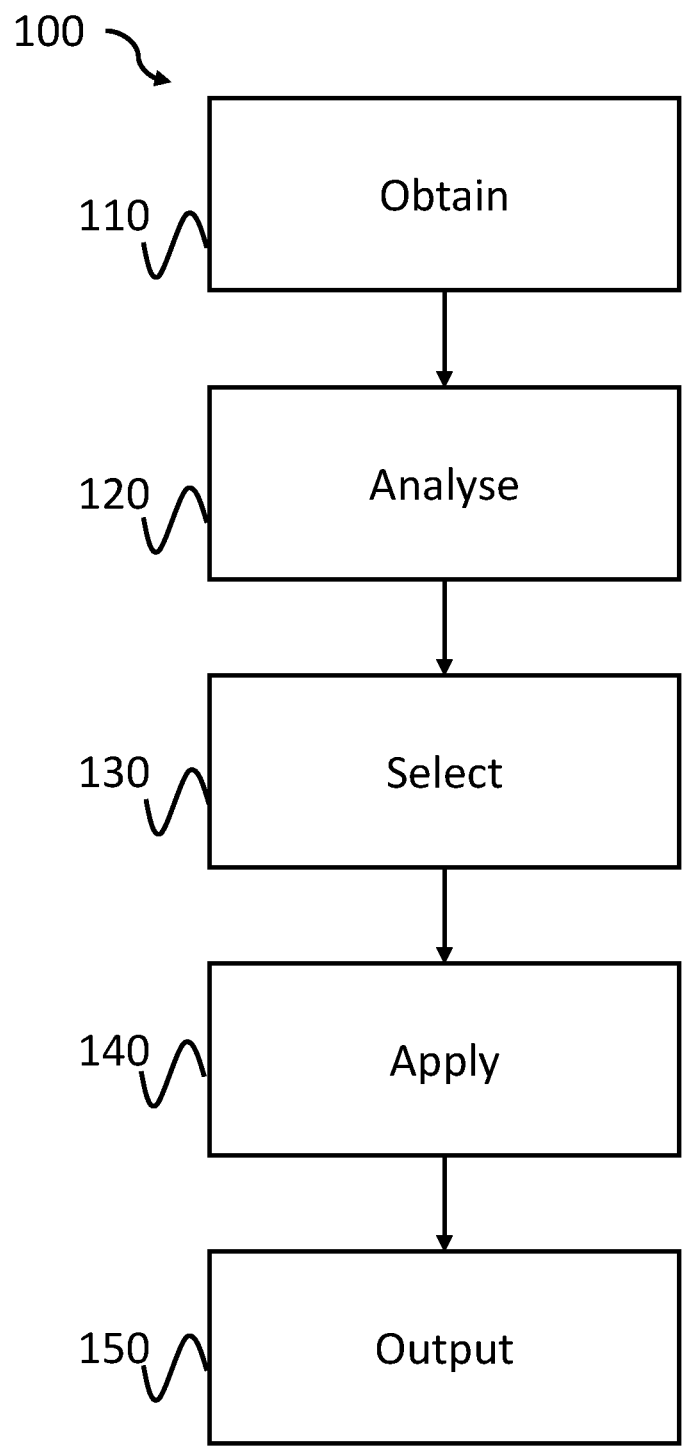
FIG. 1 is a flow diagram illustrating a method according to an example.

FIG. 1 is a flow diagram illustrating a method 100 according to an example. At item 110, at least one frame of input data is obtained from at least one sensor, the frame of input data being representative of a real-world environment at a given time. The frame of input data may be visual data captured from a sensor, such as a camera capable of capturing images. The images may represent an area of the real-world environment in colour or greyscale. In other examples, it will be appreciated that the input data will be data associated with another sensor, such as a time of flight sensor. In yet a further example, the input data may be received from a plurality of sensors, each sensor may be the same or different, and the input data may undergo preprocessing, such as by an image signal processor (ISP) to generate an accurate representation of the real-world environment at the first time based on the output of the plurality of sensors.

In some examples, the input data may comprise multiple frames of input data, each frame of input data representative of the real-world environment at a different time. In another example, the input data may be captured at the same time but from a different location. Each frame of input data may be stored in storage of a hardware accelerator, or in storage external to the hardware accelerator as will be described below with reference to FIG. 4a.

Once the input data has been obtained, the method proceeds to item 120 where the frame is analysed to determine at least one region within the input data, this region may be a foveal region representative of a region of particular interest. The input data may be analysed to determine more than one region, such that the regions of input data are representative of particular regions of interest. For example, where the input data is visual data representative of a real-world environment and received from a camera, the analysis of the input data may be undertaken to determine which objects in the real-world environment are in the foreground, and which objects are within the background. Each group of objects may be assigned to a region, for example all objects determined to form part of the foreground may be assigned to a first region and all objects determined to form part of the background, may be assigned to a second region.

In addition to, or alternatively to analysing the input data to determine whether objects within the real-world environment are in a foreground or background of the real-world environment, other hardware may be used to determine one or more regions of the input data. For example, hardware such as an eye tracker, arranged to track or follow the gaze of a user may be used to determine an area of the input data of particular importance. This is useful in augmented reality embodiments, where a user wears a headset or other device configured to detect where they are focusing, and information associated with the real-world environment is then used to indicate the first region. This region may be linked to the foveal region of the user detected by the eye tracker, and adjusted across numerous frames of the input data based on the movement of the user's foveal region. Furthermore, where the region is based on a foveal region of the user, a second region may be associated with the periphery region of a user. It will be appreciated that other regions may be determined based on a combination of the techniques mentioned above, and based on the requirements of the depth map information to be produced.

Once the region of the frame has been determined, a method for generating depth information associated with the first region may be selected at item 130. The method may be a software program stored in the storage of the hardware accelerator or of a processor, or in external storage associated with a system, as will be described below with reference to FIG. 4a or 4b. Alternatively, the method may be implemented in hardware. The hardware accelerator may have access to a plurality of different methods for generating depth information, each method having different requirements and producing outputs of different accuracies. For example, a first method may produce an output at a first accuracy, and a second method may produce an output at a second, lower accuracy.

Where multiple regions of the input data are determined, the method 100 may be arranged to select more than one method of generating depth information, wherein each method of generating depth information is associated with one or more of determined regions.

Each method is applied to the respective region of the input data at item 140. The application of the method to the input data generates depth information associated with said region. The depth information is indicative of the relative depths of objects within the region in the real-world environment with respect to the position of the sensor within the real-world environment.

Following the generation of the depth information associated with at least one region of the input data, it is output at item 150. The depth information may be output to storage, or alternatively to another processor or hardware accelerator associated with the system. For example, in an augmented reality system, the depth information may be used to generate a depth map associated with a real-world environment a user is viewing. The depth map may then be used by a processor to insert a computer-generated object into a view for display to the user such that the computer-generated object appears to be located within the real-world environment. For example, the computer generated object may be such as being inserted behind an object present within the real-world environment.

In examples where multiple regions are detected, and multiple methods for generating the depth information are selected and applied to the respective regions, the method may further comprise a step of combining the depth information. Combining the depth information enables multiple methods to be used to produce depth information indicative of the entire input data, such as for the entire field of view of the user. This may be used to generate depth maps where certain regions of the depth map have a higher accuracy than other areas. This may be used in combination with the example described above in relation to eye tracking. The eye-tracking hardware may be arranged to detect and track an area within the real-world environment where a user's gaze is directed. This area may be designated as the foveal region, and a method which produces a highly accurate output may be applied to that area of the frame. Other areas within the frame, such as the periphery of the user's field of view may have a second method applied, whereby the second method produces an output with lower accuracy than the method applied to the foveal region. This enables the majority of the resources to be utilised during the generation of the depth information associated with the area where a user is actually focused. Similarly, where an alternative method of determining regional information is used, items in the foreground may have the high accuracy method applied to them, and as such depth information associated with objects closer to the user may be obtained at a higher accuracy, than for objects in the background of the user's field of view.

By enabling different regions of the input data to have depth information generated at different levels of accuracy, the resource usage can be optimized to produce the highest quality output, in the most efficient manner.

Whilst the regions of the input data may be variable as described above, and based on one or more characteristics of a user, such as being based on where they are looking, the regions may also be fixed and represent a standard, set area within the input data, such as the centre of the input data.

In some examples, it may be desirable to obtain input data over a predetermined period of time, such as in an augmented reality embodiment, where a user is moving through the real-world environment. When multiple frames of input data are captured, it is necessary to generate the depth information for each of the frames, this can be achieved by generating depth information for each of the frames. When the difference between the frames is below a predetermined threshold, the depth information for a previous frame may be used, and adjusted or updated based on one or more parameters.

When a user moves throughout the real-world environment, a sensor may detect changes in location and orientation. The output of the sensor may then be used as the parameter to adjust the depth information of a previous frame. Such sensors may form part of an inertial movement unit (IMU) which comprises hardware for detecting a plurality of changes in the position and orientation of the user. In one embodiment, where a user moves throughout the real-world environment, an accelerometer and a positioning system, such as global positioning system, or a local position system, may be used to determine a motion vector. The motion vector may then be applied to the depth information of a previous frame which has been stored in a buffer or other storage associated with the hardware accelerator. This enables the depth information to be updated and used to provide an approximation of the actual depth information for the new frame. One example of this is if a user were to rotate their head whilst wearing a heads up display. This rotation may be recorded by one or more sensors within the heads up display and used to adjust the depth information generated for a previous frame. By updating previously generated depth information, instead of generating new depth information, the amount of processing required is further reduced, as reusing previously generated depth information and applying a translation, or motion vector requires comparatively less processing power. In some examples, the depth information may be generated for a subset of frames, such as every two, or every three frames, and adjusted to produce depth information for the intervening frames. In yet further examples, depth information may be generated for the first region, such as the foveal region, of every frame, but for other regions, such as the periphery region of a user's field of view the depth information may be generated every two or three frames, for example, and updated as mentioned above.

In some examples, the method 100 may also comprise a step of refining the depth information. This may be performed by applying a sub-pixel matching algorithm, which will increase the fidelity of the depth information. Matching algorithms applied to the input data received from a stereo set of sensors can generate the depth information according to the integer locations of the disparity. Sub-pixel matching algorithms increase the accuracy of the depth information by searching the depth information based on the fractional disparity information. For example, a sub-pixel matching algorithm can search the depth information at half pixel or quarter pixel locations. The introduction of sub-pixel matching algorithms increases the computational complexity. Therefore, sub-pixel matching algorithms can be applied to the foveal region, whereas lower complexity matching algorithms at integer level can be applied to the periphery region.

In some examples, the method 100 may also comprise a step of smoothing the depth information. A filtering operation, for example a median filter, can be applied to the generated depth information. Application of a smoothing filter to the depth information will replace the irregular depth values with filtered values representing the depth information more accurately. Application of a filter will increase the computational complexity. Therefore, application of a post processing filter to the depth information can be applied only to the foveal region.

Figure 2:
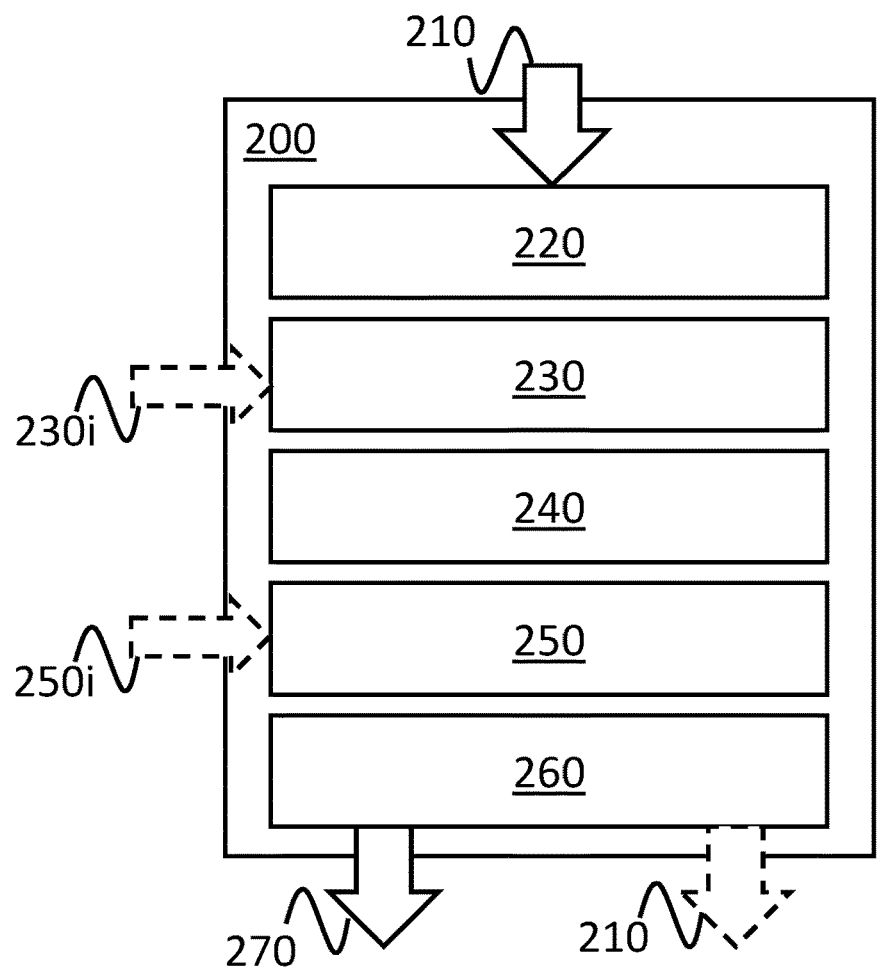
FIG. 2 shows schematically a hardware accelerator according to an example.

FIG. 2 shows schematically a hardware accelerator 200 according to an example. The hardware accelerator 200 may form part of a processor, such as a graphics processing unit, or maybe a separate unit arranged specifically for processing and generating depth information from input data 210 received from one or more sensors (not shown). The hardware accelerator 200 comprises an input module 220 arranged to receive the input data 210 from one or more sensors. The one or more sensors may comprise cameras, or other equipment capable of capturing data associated with a real-world environment.

The hardware accelerator 200 also comprises an analysis module 230 for analysing the input data 210 and determining one or more regions of the frame of input data 210. The analysis module 230 may receive further input 230$i$ from external hardware (not shown) such as eye-tracking hardware, used to specify or otherwise aid in the determination of the one or more regions. For example, when the hardware accelerator 200 forms part of a heads up display for use in presenting augmented reality content, eye-tracking hardware, may be used to determine an area within the real-world environment which falls in the user's foveal region. In other examples, the analysis module 230 may be used to analyse the frame to determine objects within the foreground and/or background of the field of view of the sensor and organize the objects into such regions. This determination may be undertaken by a separate classification module (not shown) may be used to determine which objects are within the foreground and/or background of the field of view.

Once the regions of the frame have been determined, the hardware accelerator 200 selects methods for generating depth information associated with each region using a selection module 240. The selection module 240 may determine which one of a plurality of methods for generating depth information may be used for a particular region. For example, one region may be a foveal region associated with the user's field of view, the selection module 240 selects a method of generating depth information which produces a highly accurate output since this is where the user will be focusing, and hence is required to be particularly detailed.

Upon selection of a method for generating depth information, the method is applied to the frame of input data 210 at the processing module 250. The processing module 250 is arranged to generate the depth information using the selected method and the frame of input data 210. In some examples, the processing module 250 may not be configured to apply the method to every frame of input data 210, but may, in fact, be configured to apply the method to a subset of frames, such as every other or every three frames of input data 210. In such an example, the processing module 250 is arranged to obtain one or more parameters 250i associated with the movement of a user within the real-world environment. The one or more parameters 250i may be obtained from an external device, such as an IMU, for determining the movement of the user. Furthermore, the frequency in which the processing module 250 generates depth information based on a selected method may be determined based on the difference in position and/or movement of the user within the real-world environment. For example, if it is determined that the movements of the user fall below a predetermined threshold, then the depth information associated with a previous frame of input data may be used and adjusted in accordance with the parameter 250i. The parameter 250i may also comprise information associated with the motion of objects within the frame, and compensate and adjust the input data accordingly to account for said motion. This adjustment may be undertaken by the processing module 250 itself or by an alternative module, such as an adjustment module (not shown) forming part of the hardware accelerator. In yet a further example, the selection module 230 may indicate one of a plurality of processing modules 250 based on the selected method of generating depth information, and each processing module 250 may be configured to apply a particular method of generating depth information to the input data 210. In one example, the parameter may be used to adjust the depth information between regions based on whether objects are classified as forming part of the foreground or part of the background of the real-world environment. Where an object is part of a foveal region representative of the foreground of the real-world environment, the movements of the user will affect these objects in the foveal region more than the objects of forming part of a periphery region representing objects in the background of the real-world environment. The parameter 250i can therefore be used to reflect this when adjusting the depth information.

The depth information 270 generated by the processing module 250 is output by the output module 260. The depth information 270 may be output to memory (not shown) or to a further processor (not shown) for use in generating content for display on a display device (not shown). In some examples, such as where the input data 210 is visual data captured by a camera, the input data 210 may also be output by the output module 250, such as to a display device.

Figure 3:
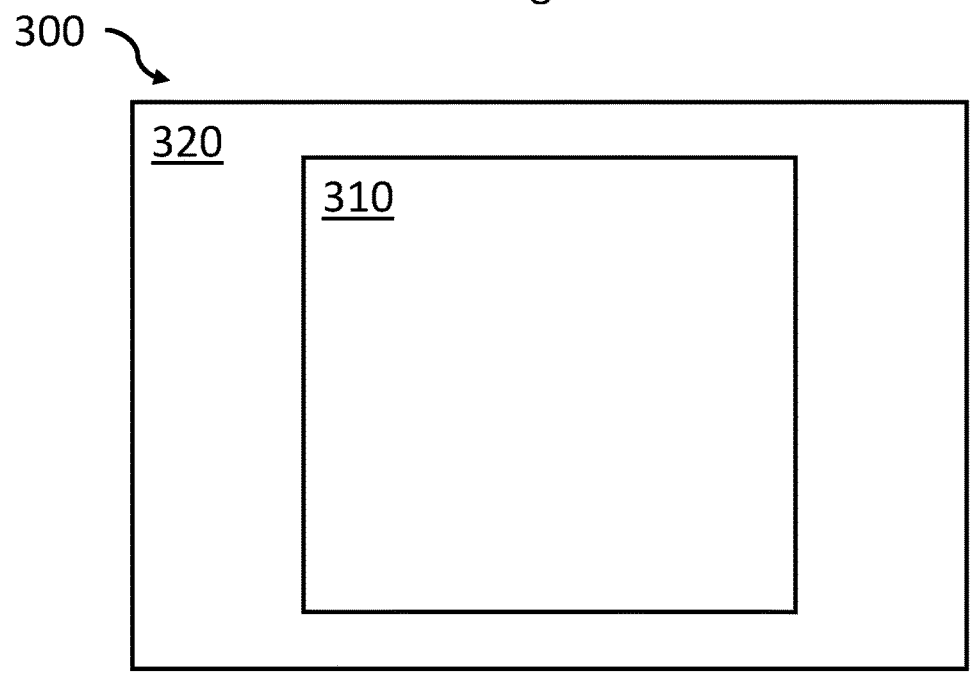
FIG. 3 shows schematically the determination of a first region and a second region of input data according to an example.

FIG. 3 shows schematically the determination of a foveal region 310 and a periphery region 320 of the frame 300 according to an example. The foveal region 310 of the frame 300 may be associated with an input received from a device, such as an eye-tracking component forming part of an augmented reality device or heads-up display. The input received from the device may indicate a foveal region of a user's field of view. The foveal region may be allocated to a foveal region 310 of the frame 300 for processing by a highly accurate method as described above in relation to FIGS. 1 and 2. In such an example, a depth generation method may be used on the foveal region 310 which produces a highly accurate output since the foveal region 310 represents the area in the user's field of view where they are focusing. Similarly, input may be received indicating a periphery region 320, the periphery region 320 may, in the example described above, be representative of the peripheral region of a user's field of view. Since the peripheral region of the user's field of view does not require highly accurate depth information compared to the foveal region, a method of generating the depth information which produces a lower accuracy output may be used. This reduces the computational resources required. In some examples, the periphery region 320 may be processed using an external device, such as a GPU, or may be processed at a lower frequency when compared to the foveal region 310.

Figure 4A:
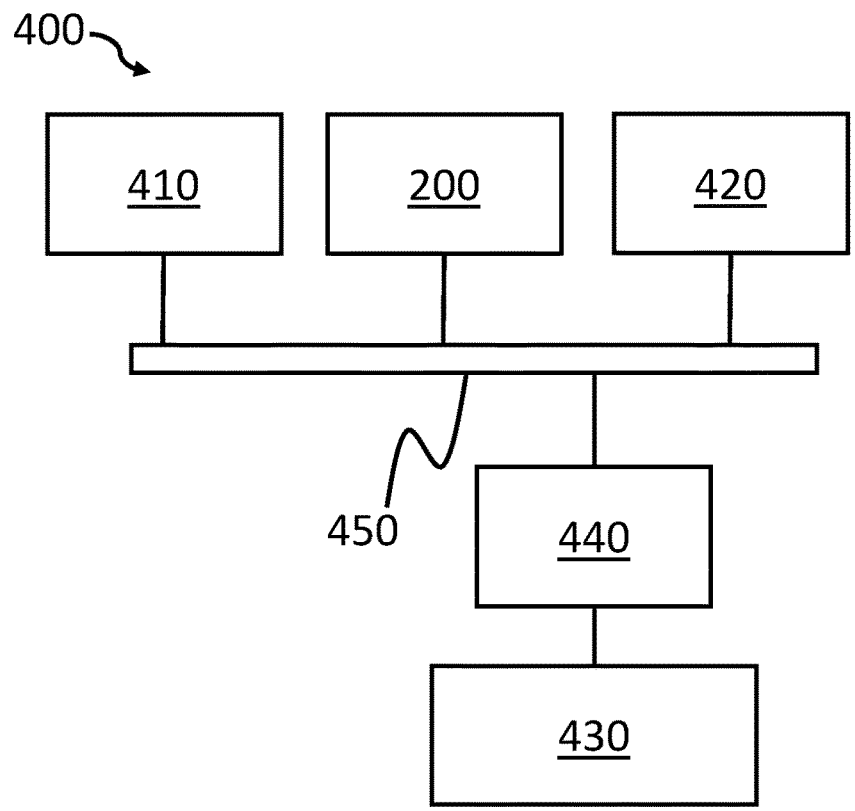
FIG. 4a shows schematically a system according to a first example.

FIG. 4a shows schematically a system 400 according to a first example. The system may form part of a head-mounted display, mobile computing device, or other wearable devices. The system 400 comprises a hardware accelerator 200, as described above in relation to FIG. 2, and also comprises a sensor, or sensor system 410, and a processor 430. The sensor or sensor system 410 may be any combination of sensor capable of obtaining information about a real-world environment. This includes, but is not limited to image sensors, such as cameras capable of capturing visual data, infrared data, or other radiation capable of being used to detect or generate depth information associated with the real-world environment. In some examples the sensor or sensor system 410 may include other sensors such as sonar, LiDAR sensors, a laser range finder, or any other sensor capable of obtaining time-of-flight information associated with a real-world environment.

The system 400 also comprises a processor 420, such as a GPU, which is arranged to generate depth information for at least a periphery region of a frame of the input data received from the sensor 410. The processor 420 may be used in conjunction with the hardware accelerator 200 to generate the depth information, for example the hardware accelerator 220 may provide highly accurate depth information for the foveal region and the processor 420 may produce lower accuracy depth information for the periphery region.

The system may also comprise a secondary sensor or set of sensors (not shown) for detecting and tracking a user's eye movements, as well as the movements of a user within the real-world environment. The secondary sensor or set of sensors may include an accelerometer or other motion detection sensors; a location positioning sensor, such as a global or local positioning system sensor, GLONASS, Galileo, or indoor positioning system; and/or a wireless connectivity module such as Wi-Fi and/or Bluetooth® sensor capable of determining the position of a device relative to one or more access points. Such sensors may form part of an IMU. It will be appreciated that any number and/or type of sensor in combination may be used and may form part of an IMU.

The system 400 also comprises memory 430 for storing at least the depth information, and in some embodiments algorithms and methods for generating the depth information. The memory is accessed via a memory controller 440. The memory 430 may also be arranged to store other information for use by the system 400 for use by the hardware accelerator 200 or any of the other processors 420. For example, the memory 430 may be arranged to store depth information relating to previous frames of input data, such that the hardware accelerator 200 or the processor can read that information and use it in combination with the input from one or more secondary sensors (not shown) to refine and/or update the depth information for a second frame.

The memory controller 440 may comprise a dynamic memory controller (DMC). The memory controller 440 is coupled to the memory 430. The memory controller 440 is configured to manage the flow of data going to and from the memory 430. The memory 430 may comprise a main memory, otherwise referred to as a 'primary memory'. The memory 430 may be an external memory, in that the memory 430 is external to the system 400. For example, the memory 430 may comprise 'off-chip' memory. The memory 430 may have a greater storage capacity than the memory cache(s) of the ISP 200 and/or other processors 420. In some examples, the memory 430 is comprised in the system 400. For example, the memory 430 may comprise 'on-chip' memory. The memory 430 may, for example, comprise a magnetic or optical disk and disk drive or a solid-state drive (SSD). In some examples, the memory 430 comprises a synchronous dynamic random-access memory (SDRAM). For example, the memory 430 may comprise a double data rate synchronous dynamic random-access memory (DDR-SDRAM). The memory 430 may be arranged to store depth information as an output from the hardware accelerator 200.

One or more of the hardware accelerator 200, the processor 420, and the memory controller 440, the sensor system 410, and the one or more other sensors (not shown) may be interconnected, for example using system bus 450, although it will be appreciated that the hardware accelerator 200 and at least one of the other components 410, 420, 440 of the system 400 may be directly connected to one another such that the output of one component is connected directly to the input of another component in a pipeline. This allows data to be transferred between the various components. The system bus 450 may be or include any suitable interface or bus. For example, an ARM® Advanced Microcontroller Bus Architecture (AMBA®) interface, such as the Advanced eXtensible Interface (AXI), may be used.

Figure 4B:
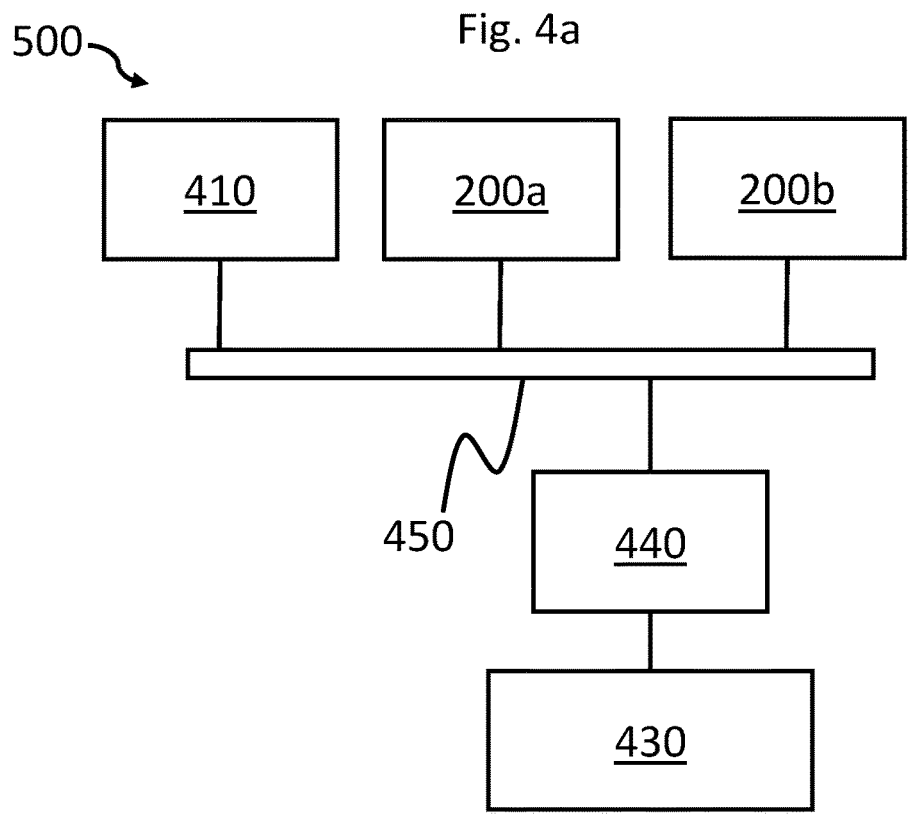
FIG. 4b shows schematically a system according to a second example.

FIG. 4b shows schematically a system 500 according to a second example. The system 500 comprises many of the components described above in relation to system 400 of FIG. 4a, however also comprises a second hardware accelerator 200b to complement the first hardware accelerator 200a. The second hardware accelerator 200b may be arranged to output depth information in relation to a periphery region or may work in parallel to generate depth information for subsequent or interlacing frames of the input data captured by the sensor 410. Whilst the system 500 does not show a processor 420 as in system 400, it will be appreciated that the system 400 may also comprise a second hardware accelerator 200b in addition to the processor 420.

The above examples are to be understood as illustrative examples of the present disclosure. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A method for obtaining depth information, the method comprising the steps of:
    obtaining eye tracking information associated with the gaze of a user;
    obtaining a first frame of input data from at least one sensor, the first frame of input data representative of a real-world environment at a first time;
    analysing the first frame to determine a foveal region within the first frame, such that the foveal region is associated with the gaze of the user;
    selecting at least one method for generating depth information associated with the real- world environment based on the first frame;
    applying the method to the foveal region to generate depth information associated with the foveal region;
    storing the depth information associated with the foveal region;
    obtaining at least a second frame of input data from the sensor, the second frame of input data representative of the real-world environment at a second subsequent time;
    adjusting the stored depth information based on a parameter associated with the movement of the user between the first time and the second subsequent time;
    determining a foveal region of the second fame of input data;
    associating the adjusted depth information with the foveal region of the second frame of input data; and
    outputting at least the depth information associated with the foveal region of the first frame, and the adjusted depth information associated with the foveal region of the second frame of input data.

2. The method of claim 1, wherein:
    selecting at least one method for generating depth information associated with the real- world environment comprises selecting at least a first and a second method, wherein the second method is less computationally intensive than the first method; and
    wherein the method further comprises:
        applying the second method to a peripheral region within the first frame to generate depth information associated with the peripheral region;
        combining the depth information associated with the peripheral region and the depth information associated with the foveal region; and
        outputting at least the combined depth information.

3. The method of claim 2, wherein the depth information associated with the foveal region has a first accuracy, and the depth information associated with the peripheral region has a second accuracy, where the first accuracy is greater than the second accuracy.

4. The method of claim 1, further comprising classifying objects in the first frame of input data representative of the real-world environment at a first time, as either a foreground object or a background object; and associating foreground objects with the foveal region.

5. The method of claim 1, wherein the at least one parameter is obtained from a sensor arranged to measure movement of a user within the real-world environment.

6. The method of claim 1, wherein the step of adjusting the stored depth information comprises applying a motion vector to the stored depth information, the motion vector being determined based on the parameter associated with the movement of the user.

7. The method of claim 1, further comprising the step of refining the depth information by applying a sub-pixel matching algorithm to the depth information to increase the accuracy of the depth information.

8. A hardware accelerator comprising:
    a gaze detection module for detecting the gaze of a user;
    an input module arranged to obtain:
        a first frame of input data from at least one sensor, the frame of input data representative of a real-world environment at a first time; and
        a second frame of input data from the sensor, the second frame of input data representative of the real-world environment at a second subsequent time;
    an analysis module for analysing the first frame to determine a foveal region within the first frame, wherein the foveal region is associated with the gaze of the user;
    a selection module for selecting at least one method for generating depth information associated with the real-world environment based on the first frame;

a processing module for applying the method to the foveal region to generate depth information associated with the foveal region;

an adjustment module for adjusting the depth information based on a parameter associated with the movement of the user between the first time and the second subsequent time; and an output module for outputting at least the depth information associated with the foveal region of the first frame, and the adjusted depth information associated with the foveal region of the second frame of input data; wherein the processing module is further arranged to determine a foveal region of the second frame of input data representative of the real-world environment at a second subsequent time; and to associate the adjusted depth information with the foveal region of the second frame of input data.

9. The hardware accelerator of claim 8, further comprising a classification module arranged to analyse at least the first frame, and determine whether an object within the first frame of input data representative of the real-world environment is in the foreground or background of the frame.

10. The hardware accelerator of claim 9, wherein if the object is classified as being in the foreground of the first frame, the object forms part of the foveal region.

11. A system comprising:

a image sensor; and a hardware accelerator arranged to receive at least one frame of input data from the image sensor, the hardware accelerator comprising:

a gaze detection module for detecting the gaze of a user;

an input module arranged to obtain:
   a first frame of input data from at least one sensor, the frame of input data representative of a real-world environment at a first time; and
   a second frame of input data from the sensor, the second frame of input data representative of the real-world environment at a second subsequent time;

an analysis module for analysing the first frame to determine a foveal region within the first frame, wherein the foveal region is associated with the gaze of the user;

a selection module for selecting at least one method for generating depth information associated with the real-world environment based on the first frame;

a processing module for applying the method to the foveal region to generate depth information associated with the foveal region;

an adjustment module for adjusting the depth information based on a parameter associated with the movement of the user between the first time and the second subsequent time; and an output module for outputting at least the depth information associated with the foveal region of the first frame, and the adjusted depth information associated with the foveal region of the second frame of input data; wherein the processing module is further arranged to determine a foveal region of the second frame of input data representative of the real-world environment at a second subsequent time; and to associate the adjusted depth information with the foveal region of the second frame of input data.

12. The system of claim 11, further comprising a graphics processing unit, the graphics processing unit arranged to generate depth information for at least a peripheral region of at least the first frame of input data; the peripheral region being associated with a peripheral region of the gaze of the user as determined by the gaze detection module.

13. The system of claim 11, wherein the depth information for the foveal region is generated by a first hardware accelerator and the depth information associated with a peripheral region is generated by at least one of a second hardware accelerator, and a processor.

14. The system of claim 11, further comprising an inertial measurement unit arranged to detect a difference in a positional characteristic of the user between at least the first frame and the second frame of the input data.

15. The system of claim 11, further comprising a display device, for receiving an output from at least the hardware accelerator.

16. The system of claim 15, wherein the display device is any of a head-mounted display; a mobile computing device; and a wearable device.

\* \* \* \* \*